INVENTORS
Edgar J. Rickel
Thomas D. Kernohan

BY *Scofield, Kokjer, Scofield & Lowe*
ATTORNEYS

United States Patent Office 3,494,442
Patented Feb. 10, 1970

3,494,442
AIR CONDUCTING SUPPORT STRUCTURE FOR
OVERSIZE FRONT TRACTOR WHEEL
Edgar J. Rickel, Leawood, and Thomas D. Kernohan,
Niles, Kans., assignors to Rickel, Inc., Kansas City, Mo.,
a corporation of Kansas
Filed Jan. 22, 1968, Ser. No. 699,623
Int. Cl. B60k 9/00
U.S. Cl. 180—54    3 Claims

ABSTRACT OF THE DISCLOSURE

A gooseneck wheel mount extends forwardly ahead of the radiator of the tractor with a substantial portion of the radiator masked and covered by the base of the gooseneck. A large diameter wheel is positioned beneath and pivotally coupled to the forward end of the gooseneck, the the wheel tread passing relatively close to the forward base of the gooseneck. Air breathing apertures are provided at the top of the gooseneck with means for conducting air to the radiator therefrom and additional breathing apertures are provided in the front wall of the gooseneck support with mud guard plates ahead of the latter.

SUMMARY OF THE INVENTION

In our prior application Ser. No. 616,395, filed Feb. 15, 1967, now Patent No. 3,438,454, we have disclosed a low profile tractor chassis with an oversize single front wheel which has particular utility in the field application of fertilizers, lime, insecticides and herbicides. In the unit disclosed in that application, the front wheel is partially enshrouded by a hood. In certain instances, particularly fields with a sticky or tacky soil structure, there is a tendency for mud to be picked up by the wheel treads and carried into and piled up within the hood. However, the hood serves a function in protecting the air breathing apparatus through which air is delivered to the radiator of the tractor, and simply removing it substitutes another problem.

One of the principal objectives of the present invention is to provide a structure which incorporates the basic tricycle low profile features of the device according to our aforesaid application, yet which is suitable for operation in muddy fields without jamming. It is a particular feature of the invention that we have been able to preserve and in fact enhance the flow of air through the radiator of the tractor in order to properly cool the engine. In the arrangement embraced in the instant aplpication, we have avoided any possibility of mud jamming the air inlets without sacrificing the easy steer-ability and relatively low cost of construction of the tractor.

DESCRIPTION OF THE DRAWING

In the accompanying drawing which forms a part of the specification and is to be read in conjunction therewith, and in which like reference numerals indicate like parts in the various views.

Figure 1:
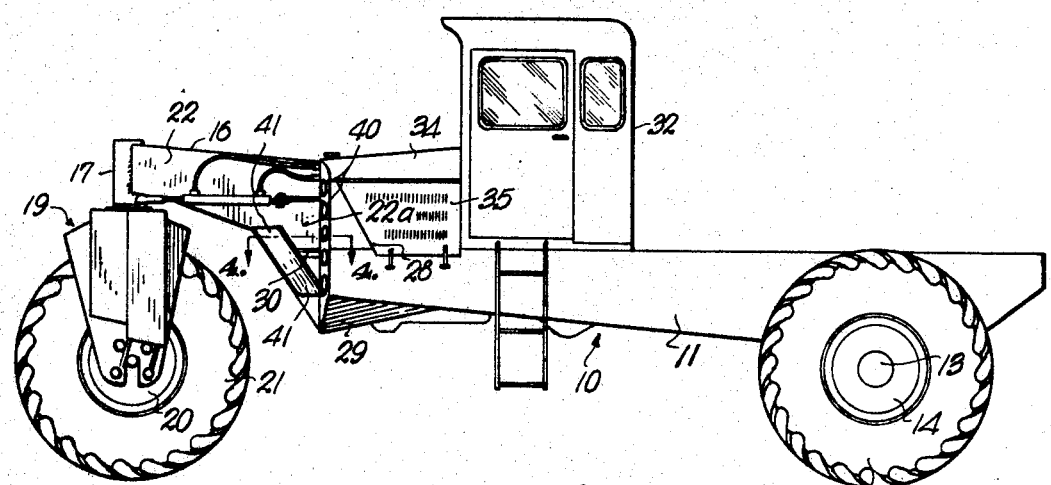
FIG. 1 is a side elevational view of a tractor embodying a preferred form of the invention, the tank or box in which materials are carried not being shown.
Figure 2:
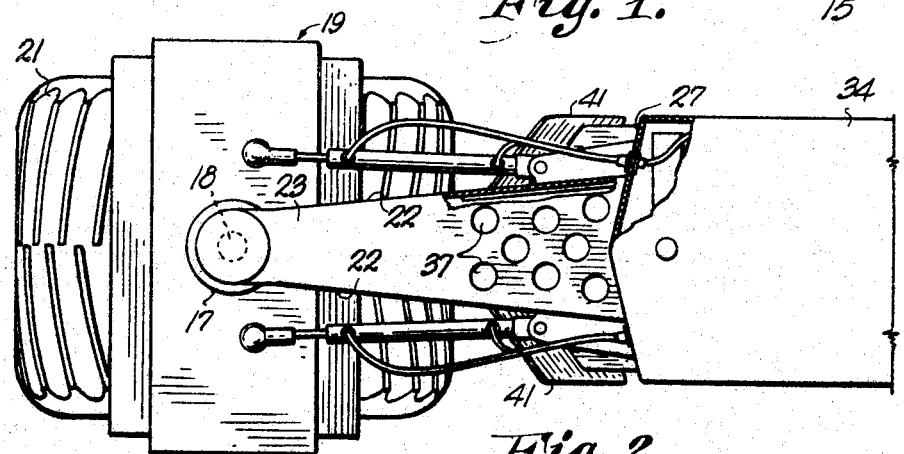
FIG. 2 is an enlarged fragmentary top plan view of the forward portion of the tractor unit, parts being broken away and shown in section for purposes of illustration.

Referring to the drawing, and initially to FIG. 1, reference numeral 10 indicates the main frame portion of the chassis of the tractor. The frame comprises the substantially parallel side rails 11 (only one of which is seen in FIG. 1) which are joined at appropriate intervals by cross beams or struts (not shown). A rear axle 13 supports the rearward end of the frame and mounted to this axle are wheel hubs 14 on which are mounted the balloon type tires 15. These tires are of the large diameter balloon type which have a low soil compaction effect. A conventional heavy duty differential (not shown) forms a part of the rear axle and this differential is supplied with power from a drive shaft of conventional type which in turn is driven from an internal combustion engine, later to be described.

The forward end of the chassis frame is constructed to provide, as in our earlier application, a special neck structure terminating in a forwardly projecting portion 16 which carries at its outer end the bearing 17. This bearing receives an upright pin 18 which is secured to and projects upwardly from a wheel yoke assembly 19. The yoke assembly carries the front wheel hub 20 on which front tire 21 is mounted. The bearing 17 is a combined thrust and rotary bearing and may be of any conventional design, permitting free turning of the yoke 19 abotu the axis of pin 18. The tire 21 is, like the tires 15, a large diameter tire having a wide tread and a low soil compaction factor.

The neck structure comprises a hollow forwardly extending box-like arrangement having the side panels 22, top plate 23, inclined front panel 24 and the inclined bottom plate 25. The side plates 22 are provided with the triangular portions 22a which join at the edges with the front panel 24.

Figure 4:
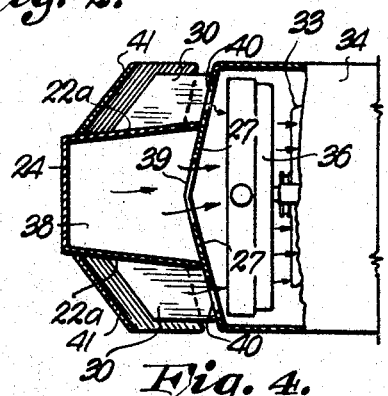
FIG. 4 is an enlarged fragmentary sectional view taken along line 4—4 of FIG. 1 in the direction of the arrows.

The neck structure 16 and its associated parts are joined to the chassis by means of the upright front plates 27 which are secured to and extend upwardly from the forward ends of the chassis side rails 11 and are disposed transversely with respect to the longitudinal axes of the tractor. Gussets 28 in each case join the upper portions of the front plates 27 to the frame rails with which they are associated. Lower gussets 29 connect the lower edges of the rails with the lower portions of the front plates 27. The front plates 27 are also connected with the side panels 22 by horizontally disposed gussets 30 (see FIGS. 1 and 4). These gussets serve an additional support function, as will subsequently be seen. The joints between the foregoing components are all preferably made by continuous welds.

Figure 3:
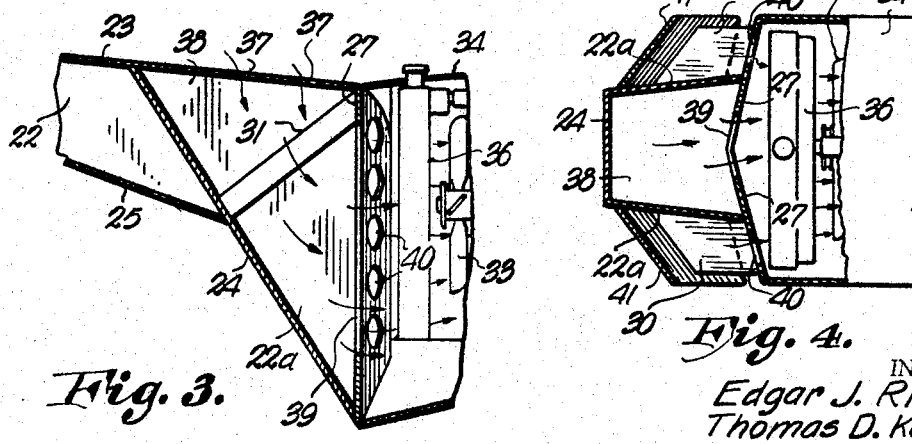
FIG. 3 is an enlarged fragmentary sectional view taken generally along the longitudinal center line of the tractor.

It will be noted that the front panel 24 extends upwardly from its bottom edge, where it connects with the upright plates 27, past the inner edge of the inclined bottom plate 25 and up to abutment with the bottom face of the top plate 23. The edges of plate 24 are welded at the lines of abutment with top plate 23 and the side plates 22 as well as with the bottom plate 25. Additional bracing and strengthening of the neck structure is provided through the inclined bar-like brace members 31 which, as noted in FIG. 3, are welded or otherwise securely affixed to the side panels 22 and to plates 27 and 24.

The tractor engine is mounted ahead of the operator cab 32, the engine fan being indicated generally at 33. The engine is mounted on appropriate mounts (not shown) in conventional fashion, and is positioned within an engine housing having the hood 34 and fitted with the louvered side panels 35. The engine is located directly behind and is masked from the front by the upright plates 27. A radiator 36 is located within the engine housing in front of the engine fan 33, the radiator being connected through appropriate tubing (not shown) with the engine block for circulation of coolant between the radiator and block in the usual fashion.

To provide for flow of air to and through the radiator as induced by the engine fan, the top wall 23 of the neck structure is provided with a plurality of openings 37 which establish communication between the atmosphere and a compartment 38 located behind the inclined plate 24. The front upright plates 27, which define the rear wall of compartment 38, are likewise apertured as at 39, the opening 39 preferably being of substantially equal height with the over-all height of the radiator and of substantial width. The opening 39 is located between the side wall panel portions 22a.

Exteriorly of the panels 22a, the front or upright plates 27 are apertured as at 40 to provide additional flow paths for air from outside the engine compartment to and through radiator 36 under the influence of the fan. The openings 40 are screened from clogging by mud which may be thrown upwardly by tires 21 by laterally extending wings or flaps 41 on each side of the neck structure. These flaps are slightly swept back with respect to the longitudinal axis of the tractor and are secured in place by welding their inner edges to the forward edges of the side plate portions 22a and their mid portions to the forward edges of the earlier described gussets 30.

Steering of the tractor is accomplished as described in our earlier application. Reference to that application may be had for further detail, if desired.

In operation, the engine drives its associated fan 33, which in turn operates to induce air flow through the radiator 36. Air is freely accessible to the radiator, not only through the openings 37 in the top wall of the neck structure 16 and the duct formed by compartment 38, but also through the openings 40 to either side of the neck structure. Obviously, the openings 37 are protected against either clogging or introduction of mud therethrough and the air is channeled toward the engine by the duct-like interior of the neck structure formed by the plate 24 and its associated side panel portions 22a. The side openings 40 are protected from being clogged or from receiving mud by means of the side wings 41.

From the foregoing, it will be seen that this invention is one well adapted to attain all of the ends and objects hereinabove set forth together with other advantages which are obvious and which are inherent to the structure.

As many possible embodiments may be made of the invention without departing from the scope thereof, it is to be understood that all matter herein set forth or shown in the accompanying drawing is to be interpreted as illustrative and not in a limiting sense.

Having thus described our invention, we claim:

1. In a tractor chassis of the type having a front engine housing, a fan within the housing for drawing air through the forward end thereof, and a gooseneck front wheel mounting structure having a base portion partially covering the front of said housing and a wheel connecting section extending forwardly from said base portion, the improvement comprising structural load bearing members forward of the base portion and cooperating with said base portion and forwardly extending wheel connecting section to form a duct-like passageway within said mounting structure, the top wall of said mounting structure provided with apertures establishing communication between said passageway and the atmosphere, said passageway terminating at the front of said engine housing and open to flow of air therethrough induced by said fan.

2. The improvement as in claim 1, including front engine housing closure members located to each side of said base portion and cooperating with said base portion to cover the front of said engine housing, said closure members apertured for flow of air therethrough, and frontal mud guard wings secured to opposite sides of said mounting structure and extending laterally therefrom, said wings disposed forwardly of said closure members.

3. The improvement as in claim 2, said wings swept back with respect to the longitudinal axis of said tractor chassis.

References Cited

UNITED STATES PATENTS 1,126,960 2/1915 Day.
2,442,563 6/1948 Greiner.

FOREIGN PATENTS 681,670 10/1952 Great Britain.

LEO FRIAGLIA, Primary Examiner

M. L. SMITH, Assistant Examiner